March 1, 1966  R. E. PHELON  3,237,480
REINFORCED CASTING AND METHOD FOR MAKING THE SAME
Filed Feb. 16, 1961
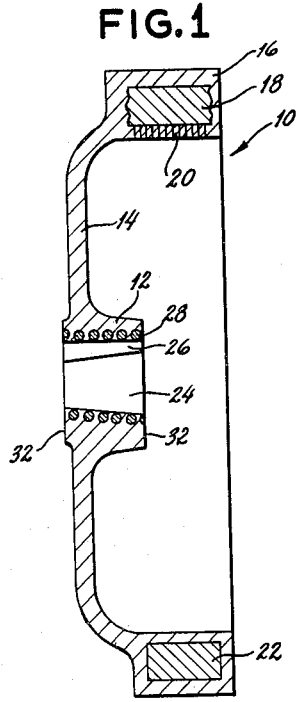
FIG. 1
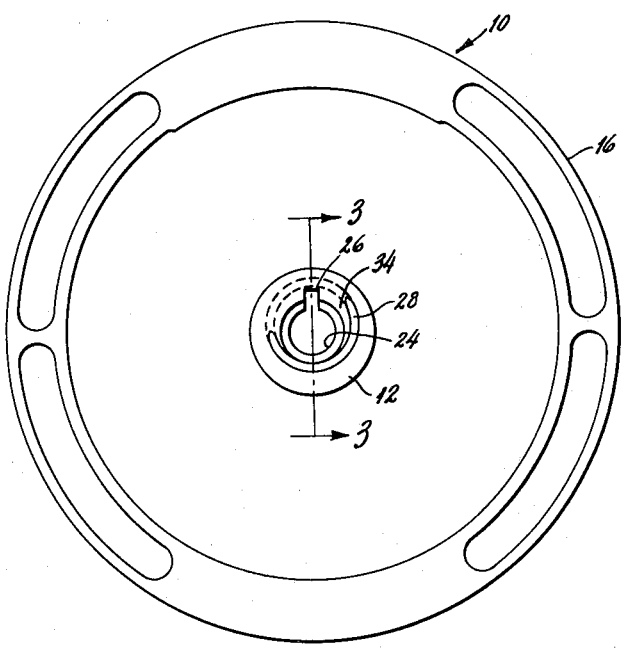
FIG. 2
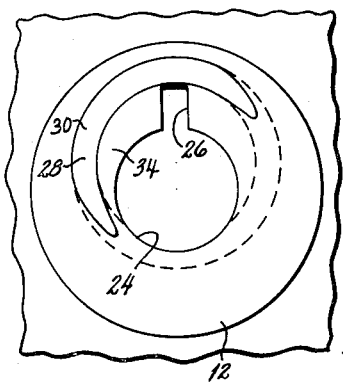
FIG. 4
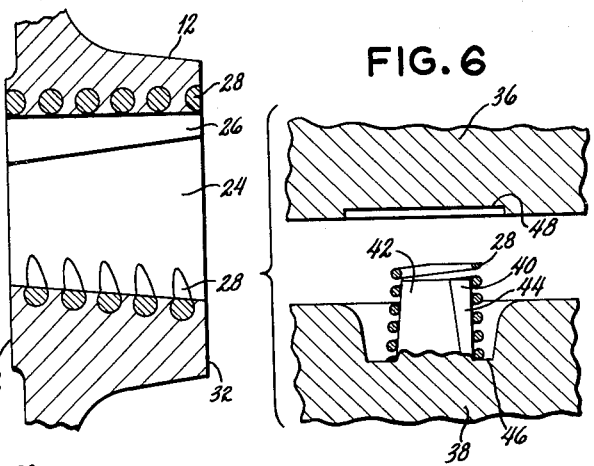
FIG. 3
FIG. 6
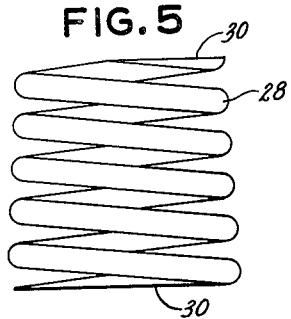
FIG. 5
INVENTOR
RUSSELL E. PHELON
BY
Teller, McCormick, Paulding & Huber
ATTORNEYS United States Patent Office 3,237,480
Patented Mar. 1, 1966

3,237,480
REINFORCED CASTING AND METHOD FOR
MAKING THE SAME
Russell E. Phelon, 114 Prywood Road,
Longmeadow, Mass.
Filed Feb. 16, 1961, Ser. No. 89,744
9 Claims. (Cl. 74—572)

This invention relates to articles made by a casting process, and deals more particularly with a relatively soft metal cast article having a strengthened or reinforced hub and to a method for making the same.

In the past, and even today, it has been and is a common practice to make many machine parts such as flywheels, pulleys, and gears from relatively soft, nonferrous materials and by a casting process. Die cast flywheels and pulleys of aluminum, zinc or various alloys are well known examples of such articles. These parts are generally provided with a hub portion having a bore and usually include a keyway for attaching the same to a shaft or the like. The bore may be straight or tapered for receiving a correspondingly shaped shaft and the part is usually axially fixed to the shaft by a nut threaded onto the shaft and into engagement with the outboard end of the hub portion.

This method of securing the part to a shaft is convenient and simple, but has several disadvantages. In the usual case where the hub is made of the same material as the remainder of the part, the soft hub material will yield under a relatively light torque on the nut which holds the flywheel in place. This allows the part to become loose and twist on its shaft. Likewise, if the part is forced too tightly onto a tapered shaft, the wedging action of the shaft will often act to burst or rupture the hub. Also, the presence of a keyway severely weakens the hub since its sharp corners act as points of relatively high stress concentration.

The general object of this invention is therefore to provide a simple and relatively low cost reinforced hub construction for a cast article and also to provide a method for making such a hub construction.

Another object of the invention is to provide a reinforced hub construction which includes a reinforcing member that surrounds the hub bore to strengthen the same against bursting pressures and which extends the full length of the hub to strengthen the same against axial compressive loads.

Another object of this invention is to provide a reinforced hub construction for a cast part, the construction employing an axially compressible reinforcing member which is placed over the hub core during the casting process and which automatically adjusts to the closing of the die or mold, without damaging the latter, so as to always extend the full length of the hub even in cases where chips or other foreign matter prevents the mold or die parts from closing entirely.

A further object of this invention is to provide a reinforced hub construction for a cast part, the construction being such that a keyway may be cast in the bore of the hub during the casting operation rather than being formed separately by a latter machining operation. In keeping with this object, it is a more particular object that the keyway be defined entirely by the cast material so that the strength of the reinforcing member is not jeopardized by the member being machined or otherwise cut to provide for a portion of the keyway.

Other objects and advantages of the invention will be apparent from the drawings and from the following description.

The drawing shows a preferred embodiment of the invention and such embodiment will be described, but it will be understood that various changes may be made from the construction disclosed, and that the drawing and description are not to be construed as defining or limiting the scope of the invention, the claims forming a part of this specification being relied upon for that purpose.

FIG. 1 is a vertical sectional view, taken on a plane passing through its longitudinal axis, of a magneto flywheel having a reinforced hub construction embodying the present invention, the flywheel being shown before the machining of its bore.

FIG. 2 is an end elevational view, looking toward the left, of the flywheel shown in FIG. 1.

FIG. 3 is an enlarged view of the hub construction as viewed in FIG. 1 but with the hub construction shown as it appears after machining.

FIG. 4 is an enlarged left end view of the hub construction shown in FIG. 3.

FIG. 5 is a side elevational view of the reinforcing element or spring employed in the hub construction of the FIG. 1 flywheel.

FIG. 6 is a fragmentary sectional view showing the two die parts used in casting the flywheel of FIG. 1, the die parts being shown in their open positions and with a reinforcing element in position on the hub core.

Referring now to the drawing, FIGS. 1 and 2 show a cast flywheel 10 having a reinforced hub construction embodying the present invention. This flywheel is of a type similar to that employed in the magneto mechanism shown by Patent No. 2,915,574 to Martin. It is to be understood, however, that this particular structure of the flywheel is shown by way of example only and that the reinforced hub construction embodied therein may be applied as well to other cast articles, such as pulleys, gears, and the like, having a hub provided with a bore for fixing the same to a shaft.

The illustrated flywheel 10 includes a central hub portion 12, a radially extending web portion 14 and a rim portion 16. Embedded in the rim portion 16 along one circumferential portion thereof is a permanent magnet and two pole pieces which cooperate with suitable pole pieces of the magneto stator. In FIG. 1, this magnet is indicated at 18 and one of the pole pieces indicated at 20. Diametrically opposite from the magnet and pole pieces is a counterweight 22 also embedded in the rim portion 16. Except for these inserts, and the hereinafter described insert employed in the reinforced hub structure, the flywheel 10 is made of a relatively soft or weak casting material, preferably a non-ferrous metal such as aluminum. The flywheel is made by a casting process, such as die casting, and the inserts are embedded therein by being placed in the proper mold or die part prior to the casting operation.

The reinforced hub construction provided by the present invention comprises an axially compressible reinforcing member or insert which is embedded in the hub portion 12 during the casting operation. As shown in FIGS. 1 and 2 the hub portion 12 is provided with an axially extending tapered bore 24 and an axially extending keyway 26, which keyway extends radially outwardly from the surface of the bore. Surrounding the bore 24 and the keyway 26 is a generally cylindrical reinforcing member 28 embedded in the cast material which comprises the remainder of the hub portion. In the preferred structure, and as shown, the reinforcing member 28 comprises a helically wound length of wire or spring having open convolutions and made of a relatively strong material such as spring steel. The structure of the spring before it is incorporated into the flywheel hub is shown in FIG. 5, from which it will be noted that the spring is provided with flat end surfaces 30, 30 at its opposite ends. Likewise, from FIG. 1 it will be noted that the hub portion 12 is provided with substantially flat radially extending end surfaces 32, 32. According to the invention, the length of the spring 28 in the finished hub structure is such that its end surfaces 30, 30 will be disposed respectively in the planes of the hub portion end surfaces 32, 32. The spring 28 therefore extends axially the entire full length of the hub portion and each of the hub portion end surfaces 32, 32 is a composite surface comprised partly of the soft cast material of the flywheel and partly of the harder material of the spring 28. As a result, an axial compressive load applied between the end surfaces 32, 32 will be applied at least in part directly to the spring 28 and at no point will the cast material of the hub portion be required to carry the entire load by itself.

As shown in FIGS. 1 and 2 the spring 28, except for having a slight taper corresponding generally to the taper of the bore 24, is a substantially cylindrical member. It is located off center or eccentrically with the axis of the bore 24 and surrounds both the bore and the keyway 26. This eccentric arrangement of the spring relative to the bore results in the provision of an inner layer of cast material of varying radial thickness located between the surface of the bore and the spring 28. This inner layer of material is indicated generally at 34 in FIG. 2 and from this figure it will be noted that the keyway 26 is located at or near the point of maximum thickness of this layer. The keyway moreover is located entirely within the cast material of the hub portion provided by the layer 34 and no machining or other cutting of the spring or reinforcing member is necessary to provide for the keyway. Also, since the spring 28 is formed with open convolutions the layer 34 of cast material is integrally connected with the remainder of the cast material located on the outside of the spring 28. Therefore the possibility of the layer 34 breaking away from the spring 28 is substantially reduced, if not entirely eliminated.

From the foregoing it should be obvious that since the reinforcing member or spring 28 surrounds the bore 24 the hub portion 12 is greatly strengthened against a bursting pressure produced by the wedging action occurring between the tapered bore 24 and the shaft to which it is applied. Thus the flywheel 10, or any other cast part provided with the illustrated hub construction, may be tightened much more firmly to a shaft than other parts having hubs made entirely from the soft casting material.

In FIGS. 1 and 2 the hub portion 12 is shown as it appears immediately after the flywheel 10 is taken from its die or mold parts. In this case, the spring 28 is located very close to the top of the keyway 26 and very close to the surface of the bore at a point diametrically opposite from the keyway. At other points, the spring is embedded more deeply in the cast material. In some instances the hub construction may be used in the as-cast condition shown in FIGS. 1 and 2. However, it is generally desirable to machine or grind the cast bore to suit the part more accurately to its shaft, and also to cut away and thereby expose some of the spring 28 along a circumferential portion of the bore. FIGS. 3 and 4 show the hub portion 12 after such a machining operation. From this it will be noted that along a circumferential portion opposite to the keyway 26 the spring 28 is cut away to some extent with the result that along this portion the bore surface is a composite surface made up partly of the cast material and partly of the spring material. This in turn has the effect of greatly improving the wearing qualities of the bore surface. In cases where it is unnecessary to provide a keyway it is contemplated that the spring or other reinforcing member may be arranged coaxial with the bore and thereafter cut away along its full inner circumference so that the entire finished bore will be a composite surface.

The method for producing the reinforced hub construction employed in the flywheel of FIG. 1 is illustrated generally by FIG. 6. Referring to this figure, the reference numerals 36 and 38 indicate respectively upper and lower mold or die parts used in the casting of the flywheel. When these parts are brought together or into closed relationship they define a mold cavity conforming generally to the desired shape of the flywheel or other article to be produced. Accordingly, the lower mold part 38 includes an upright core 40 for forming the bore 24 and keyway 26 in the hub. That is, the core includes a generally cylindrical and slightly tapered portion 42 for defining the tapered bore 24 and a radially outwardly extending portion 44 for defining the keyway 26. Surrounding the base of the core is a generally flat horizontal area 46 for defining one of the end surfaces 32 of the hub portion. The upper mold part 36 is provided with another generally flat horizontal area 48 for defining the other hub portion end surface 32.

In making the flywheel 10 or other cast article the mold parts 36 and 38 are first moved to an open position such as shown in FIG. 6. The spring 28 or other similar reinforcing member is then placed over the core 40 with its larger end down, as shown, so that the corresponding flat end surface 30 will engage the flat area 46 of the mold. The spring 28 is in turn selected or designed to be of a slightly longer length than the desired maximum axial length of the hub portion 12. This, in case of the mold parts shown in FIG. 6, means that the spring 28 will extend slightly beyond the upper end of the core 40.

The mold parts are thereafter brought together into a generally closed relationship and to such a point that the spring 28 is compressed between the two parts with one end surface 30 in engagement with the area 46 and with the other end surface 30 in engagement with the area 48. The mold parts are preferably closed to a point where the top of the core 40 engages the area 48 but in some cases this degree of closing may not be obtained due to chips or other foreign material becoming lodged between the mold parts.

After the mold parts are closed as far as possible, the mold cavity defined thereby is filled with a casting material, such as a molten non-ferrous material or alloy, and the parts held closed until the material hardens. The mold parts are then opened and the casting removed therefrom. After this, the bore formed by the core portion 42 may be enlarged and the spring element 28 cut away as by a machining or grinding process to the degree shown in FIGS. 3 and 4 to form a composite bore surface having improved wearing qualities.

It should be particularly noted that since the spring 28 is held compressed between the mold or die parts during the casting operation, the end surfaces 30, 30 thereof will always be located in the planes of the hub portion end surfaces 32, 32 despite the fact that in some instances the mold parts may not be entirely closed. Thus this process provides a method whereby it is assured that the reinforcing element will extend the entire length of the hub portion so that all parts of the said portion are reinforced thereby. This fact is of particular importance since, if the spring does not extend the full length of the hub, the annulus of unreinforced cast material thereby provided at one or the other end of the hub is free to yield under a relatively light pressure, thus allowing the hub to become loose on its shaft. Also, the weakest point of the illustrated hub is where the bore is widest, and it is often impossible to add extra cast material at this point. Therefore, the spring should extend to the very ends of the hub to be certain that this point is reinforced.

The invention claimed is:

1. A cast article having a reinforced hub construction, said article including an axially extending hub portion having an axial bore extending therethrough and having substantially flat radially extending opposite end surfaces, said hub portion being comprised of a relatively weak cast material and an axially extending reinforcing element of a relatively stronger material embedded in said cast material and surrounding said bore, said reinforcing element extending the entire length of said hub portion and having flat end surfaces which are disposed respectively in the planes of said hub portion end surfaces so that said surfaces are composite surfaces made up partly of said cast material and partly of said reinforcing element, said reinforcing element comprising a length of helically wound wire having a substantial surface area thereof exposed along at least a part of the circumference of said bore and defining a portion of the surface of said bore so that said latter surface is a composite surface made up partly of said cast material and partly of said reinforcing element.

2. A cast article having a reinforced hub construction, said article including an axially extending hub portion having an axial bore extending therethrough, said hub portion being comprised of a relatively weak cast material and a generally cylindrical axially extending reinforcing element of a relatively stronger material embedded in said cast material and surrounding said bore, said reinforcing element having its axis located off-center with respect to the axis of said bore so as to define an inner layer of cast material of varying radial thickness between the surface of said bore and said reinforcing element, and said inner layer of cast material having an axially extending keyway therein at or near the location of its maximum thickness.

3. The combination as defined in claim 2 further characterized by said reinforcing element comprising a length of helically wound wire having open convolutions so that said inner layer of cast material is integrally connected with the cast material surrounding said reinforcing element.

4. The combination as defined in claim 3 further characterized by said hub portion having substantially flat radially extending opposite end surfaces, and said helically wound reinforcing element extending the entire length of said hub portion and having corresponding flat end surfaces located respectively in the planes of said hub portion end surfaces so that said end surfaces are composite surfaces made up partly of said cast material and partly of said reinforcing element.

5. The combination as defined in claim 3 further characterized by said helically wound reinforcing element having a substantial surface area thereof exposed along a circumferential portion of said bore surface located generally diametrically opposite from said keyway and defining a portion of said bore surface so that said latter surface is a composite surface made up partly of said cast material and partly of said reinforcing element.

6. The method of producing a cast article having a reinforced hub portion, which method comprises the steps of providing two mold parts which when brought together define a cavity conforming to the shape of the desired article and one of which parts includes a core for forming a bore in the hub portion of said article, placing a longitudinally compressible reinforcing element over said core which reinforcing element is slightly longer than the desired maximum length of said hub portion, thereafter bringing said mold parts together to at least such a point as to cause said reinforcing element to be longitudinally compressed between said mold parts, and then filling the cavity formed by said mold parts with a casting material to form the desired article and to embed the reinforcing element in the hub portion thereof.

7. The method defined in claim 6 characterized by the further steps of removing the cast article from said mold parts, and thereafter removing material from the bore in the hub portion thereof to expose said reinforcing element along at least a circumferential portion of the bore surface and thereby produce a composite bore surface made up partly of said casting material and partly of said reinforcing element.

8. The method of producing a cast article having a reinforced hub portion, which method comprises the steps of providing upper and lower mold parts which when brought together define a cavity conforming to the shape of the desired article, said lower mold part including an upright core for forming a bore in the hub portion of said article and also including a horizontal flat area surrounding the base of said core for defining one end surface of said hub portion, said upper mold part having a corresponding horizontal flat area for defining the other end surface of said hub portion, placing a longitudinally compressible reinforcing element over said core which reinforcing element is slightly longer than the desired maximum length of said hub portion, thereafter bringing said mold parts together to a point where said reinforcing element is longitudinally compressed between said mold parts with the opposite ends thereof in engagement respectively with said two flat mold part areas, and then filling the cavity formed by said mold parts with a casting material to form the desired article and to embed the reinforcing element in the hub portion thereof with the result that said reinforcing element extends fully from one end surface to the other of said hub portion.

9. The method of producing a cast article having a reinforced hub portion which method comprises the steps of providing upper and lower mold parts which when brought together define a cavity conforming to the shape of the desired article, said lower mold part including an upright core for forming a bore with a keyway in the hub portion of said article and also including a horizontal flat area surrounding the base of said core for defining one end surface of said hub portion, said upper mold part having a corresponding horizontal flat area for defining the other end surface of said hub portion, placing a helical spring having flat ends and open convolutions over said core and which spring is slightly longer than the desired maximum length of said hub portion, thereafter bringing said mold parts together to a point where said spring is longitudinally compressed between said mold parts with the opposite ends thereof in engagement respectively with said two flat mold part areas, filling the cavity formed by said mold parts with a casting material to form the desired article and to embed the reinforcing element in the hub portion thereof with the result that said reinforcing element extends fully from one end surface to the other of said hub portion, removing the cast article from said mold parts, and thereafter enlarging the bore in said hub portion to expose said spring along a circumferential portion of the bore surface located generally diametrically opposite from the keyway therein to produce a composite bore surface made up partly of said casing material and partly of the spring material.

References Cited by the Examiner

UNITED STATES PATENTS

| | | |
|---|---|---|
| 914,915 | 3/1909 | Beedell. |
| 1,235,153 | 7/1917 | Osaki. |
| 1,393,666 | 10/1921 | Cordes. |
| 1,501,026 | 7/1924 | Guay. |
| 1,576,317 | 3/1926 | Eklind. |
| 2,111,590 | 3/1938 | Hoof. |
| 2,460,874 | 2/1949 | Coberly. |
| 2,672,070 | 3/1954 | Forster. |

FOREIGN PATENTS

| | | |
|---|---|---|
| 294,034 | 7/1928 | Great Britain. |
| 751,534 | 6/1956 | Great Britain. |

MILTON KAUFMAN, *Primary Examiner.*

BROUGHTON G. DURHAM, *Examiner.*